US007260406B2

(12) United States Patent
Lee et al.

(10) Patent No.: US 7,260,406 B2
(45) Date of Patent: Aug. 21, 2007

(54) METHOD FOR TRACKING LOCATION OF SUBSCRIBERS IN DUAL STACK MOBILE COMMUNICATION NETWORK

(75) Inventors: Sang Yun Lee, Gyeonggi-do (KR); Hee Hyeok Hahm, Seoul (KR); Ki Mun Kim, Incheon (KR); Young Ho Joo, Gyeonggi-do (KR); Young Ahn Ryu, Gyeonggi-do (KR); Jae Young Ju, Gyeonggi-do (KR)

(73) Assignee: S.K Telecom, Co., Ltd (KR)

( * ) Notice: Subject to any disclaimer, the term of this patent is extended or adjusted under 35 U.S.C. 154(b) by 421 days.

(21) Appl. No.: 10/456,022

(22) Filed: Jun. 5, 2003

(65) Prior Publication Data

US 2004/0185869 A1 Sep. 23, 2004

(30) Foreign Application Priority Data

Mar. 21, 2003 (KR) ...................... 10-2003-0017726

(51) Int. Cl.
*H04Q 7/20* (2006.01)
(52) U.S. Cl. .............................. 455/456.1; 455/456.2; 455/456.3
(58) Field of Classification Search ............. 455/456.1, 455/456.2, 456.3
See application file for complete search history.

(56) References Cited

U.S. PATENT DOCUMENTS 5,933,784 A * 8/1999 Gallagher et al. ....... 455/552.1

| 6,501,953 | B1 * | 12/2002 | Braun et al. ................. 455/436 |
| 6,606,491 | B1 * | 8/2003 | Peck ........................... 455/411 |
| 6,716,101 | B1 * | 4/2004 | Meadows et al. ......... 455/456.1 |
| 6,917,813 | B2 * | 7/2005 | Elizondo .................... 455/466 |
| 2002/0183069 | A1 * | 12/2002 | Myr ........................... 455/456 |

FOREIGN PATENT DOCUMENTS

KR 10-2001-0110518 A 12/2001
KR 10-2001-0113370 A 12/2001

* cited by examiner

*Primary Examiner*—Duc M. Nguyen
*Assistant Examiner*—Mazda Sabouri
(74) *Attorney, Agent, or Firm*—Lahive & Cockfield, LLP

(57) ABSTRACT

The present invention discloses a method for tracking location of synchronous and asynchronous mobile communication network subscribers by using a dual stack home location register and a dual stack mobile positioning center. When the dual stack mobile positioning center externally receives a location tracking request for a subscriber, it requests reception subscriber information to the dual stack home location register, confirms whether the terminal is located in a synchronous or asynchronous mobile communication network by referring to the reception subscriber information from the dual stack home location register and network information, and requests location tracking for the terminal to the corresponding mobile communication network. Accordingly, location of the synchronous and asynchronous mobile communication network subscribers can be tracked in the network in which mobile communication networks using different protocols coexist.

25 Claims, 5 Drawing Sheets

METHOD FOR TRACKING LOCATION OF SUBSCRIBERS IN DUAL STACK MOBILE COMMUNICATION NETWORK

BACKGROUND OF THE INVENTION

1. Field of the Invention

The present invention relates to a method for tracking location of mobile communication system subscribers, and in particular to a method for tracking location of synchronous and asynchronous mobile communication network subscribers by using a dual stack home location register and a dual stack mobile positioning center in a mobile communication network in which a synchronous mobile communication network and an asynchronous mobile communication network coexist.

2. Description of the Background Art

The wireless internet is a service for enabling moving users to transmit or receive internet information by wireless by combining the mobile communication and internet. The wireless internet has started from a short message service (SMS) and a browser mounted type such as WAP/ME, and developed into a middleware-based wireless internet service which allows the users to enjoy various multimedia services like a cable internet. The special characteristics of the wireless internet are to allow the users to receive more personalized services by using mobile communication terminals, and to provide intrinsic information based on mobility of the users. The most noticeable service of the wireless internet services provided by combining personalization and mobility of the mobile communication terminal users is a location-based service.

The location-based service implies application systems and services for precisely tracking and utilizing location of humans or objects on the basis of mobile communication terminals. The location-based service which is the integrated technology of mobile communication technology, internet technology, terminal technology, spatial information processing technology and various contents technology provides a variety of services, such as a traffic information service for tracking location of users, and searching and providing traffic information of the location, a vehicle emergency handling service for automatically tracking location of a vehicle having a trouble, and sending a traction car, an emergency handling service for notifying location of the nearest emergency room so that users injured due to accidents can be treated, a location-based payment service for discriminating a fee based on where users use mobile communication equipment, and a living information service for notifying location of the nearest and cheapest gas station, resting place and restaurant according to taste of users.

The standards of the location-based service have been defined, standardized and commonly used in the 2/2.5G synchronous mobile communication networks. However, the 3G asynchronous mobile communication network has been newly introduced, and the standards of the location-based service which can be interworked and compatible between the synchronous mobile communication network and the asynchronous mobile communication network have not been defined. Accordingly, the location-based service is not continuously provided in the network in which the synchronous and asynchronous mobile communication networks coexist.

SUMMARY OF THE INVENTION

Accordingly, it is a primary object of the present invention to provide a method for tracking location which can continuously track location of subscribers in a network in which a synchronous mobile communication network and an asynchronous mobile communication network coexist by using a dual stack mobile positioning center.

Another object of the present invention is to track location of mobile communication terminals based on a GPS or cell according to mounting of GPS receivers on the mobile communication terminals and accuracy of services requested by a location tracking request system.

Location tracking technology is divided into a network-based (cell-based) method using location area information of terminals by paging or information of a visitor location register, and a handset-based method using a GPS receiver. The cell-based method can track location of the currently-used mobile communication terminals without incurring additional expenses, but may reduce accuracy of the location according to a cell size or processing type of a base station. On the other hand, the handset-based method additionally mounts the GPS receivers on the mobile communication terminals, but precisely track location of the mobile communication terminals.

The present invention provides a method for tracking location of each subscriber in the network (dual stack mobile communication system) in which the synchronous and asynchronous mobile communication networks coexist. In addition, the GPS-based method or cell-based method is used to track location of the mobile communication terminals according to mounting of the GPS receivers on the mobile communication terminals and accuracy of services requested by the location tracking request system.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A method for tracking location of subscribers in a dual stack mobile communication network in accordance with preferred embodiments of the present invention will now be described in detail with reference to the accompanying drawings.

Figure 1:
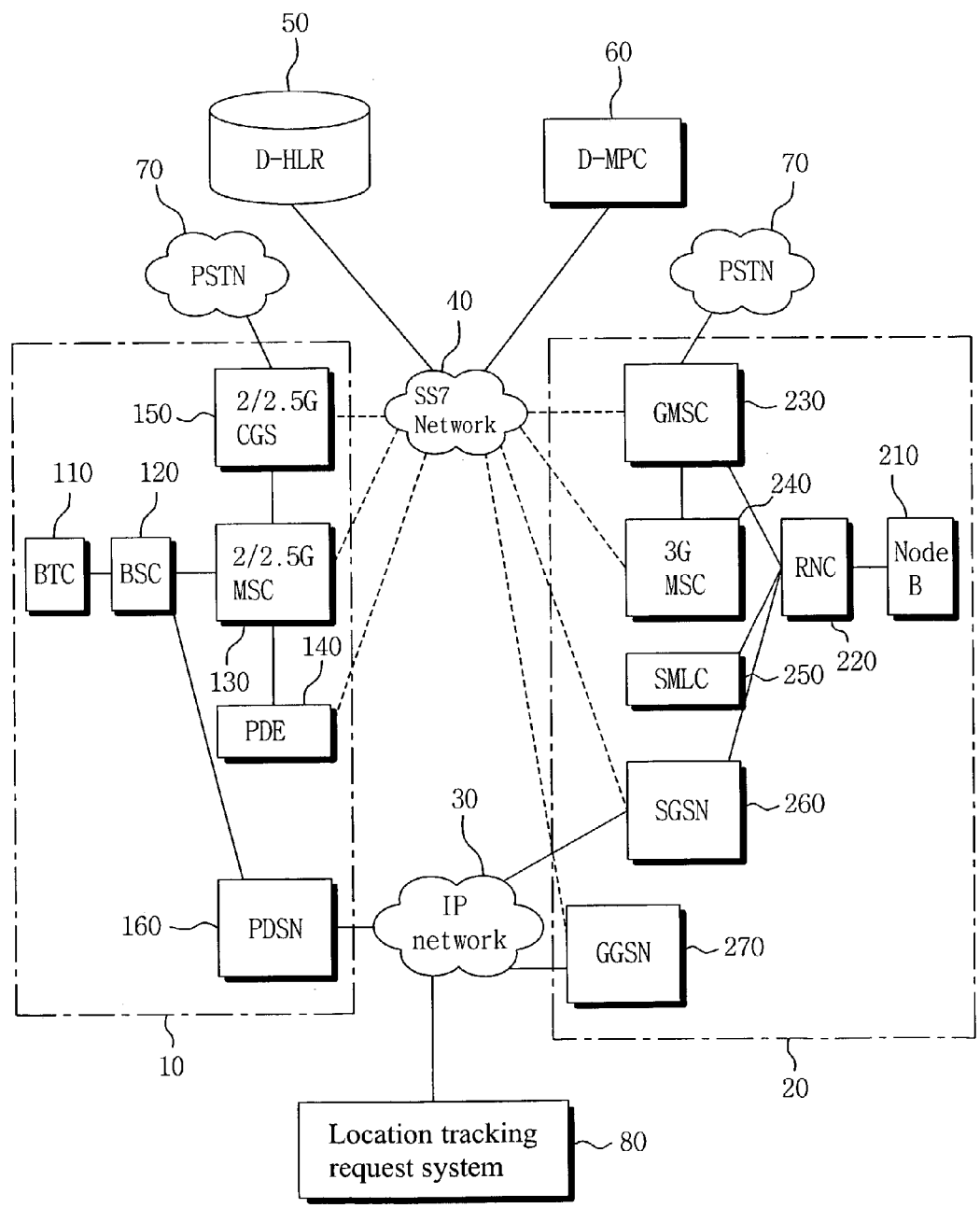
FIG. 1 is a structure view illustrating a dual stack mobile communication network to which the present invention is applied.

FIG. 1 is a structure view illustrating the dual stack mobile communication network to which the present invention is applied.

Referring to FIG. 1, the dual stack mobile communication network includes a synchronous mobile communication network 10, an asynchronous mobile communication network 20, an IP network 30, an SS7 network 40, a dual stack home location register (D-HLR) 50, and a dual stack mobile positioning center (D-MPC) 60.

The synchronous mobile communication network 10 includes a base station (BTC) 110 for performing wireless section communication with 2/2.5G mobile terminals and/or 2/2.5G and 3G mobile terminals, a base station controller (BSC) 120 for controlling the BTS 110, a 2/2.5G mobile switching center (2/2.5G MSC) 130 connected to at least one BSC 120 for switching calls, a 2/2.5G cellular gateway switch (2/2.5G CGS) 150 connected between a public switched telephone network (PSTN) 70 and the 2/2.5G MSC 130, for interworking networks and switching calls, and a packet data serving node (PDSN) 160 connected between the BSC 120 and the IP network 30 for a packet data service.

In addition, the synchronous mobile communication network 10 further includes a position determination entity (PDE) 140 on which a GPS receiver is mounted. When a location tracking request system 80 requests location tracking for a terminal to the D-MPC 60, the PDE 140 confirms whether the GPS receiver has been mounted on the terminal, interworks with the synchronous mobile communication terminal on which the GPS receiver has been mounted, and determines location of the mobile communication terminal.

When the location of the mobile communication terminal has been determined, the PDE 140 transmits it to the D-MPC 60, and the D-MPC 60 converts the location information including latitude, longitude and altitude into real geographical name information, and transmits it to the location tracking request system 80. The location information can be converted into the real geographical name information in the location tracking request system 80, not in the D-MPC 60. Preferably, the D-MPC 60 or the location tracking request system 80 includes a database for matching geographical coordinates to real geographical names in order to convert the location information into the real geographical name information. On the other hand, when the GPS receiver has not been mounted on the terminal, not the PDE 140 but the MSC 130 determines location of the terminal by paging.

When receiving a location tracking request for the terminal from the location tracking request system 80, the D-MPC 60 requests terminal information to the D-HLR 50 by transmitting a corresponding terminal number, requests location tracking to the PDE 140 by transmitting the terminal information or requests location tracking to the MSC which the terminal belongs to, receives a location tracking result from the PDE 140 or MSC, and transmits it to the location tracking request system 80.

In addition, the asynchronous mobile communication network 20 includes a node B 210 which is a base station for performing wireless section communication with 3G mobile terminals and/or 2/2.5G and 3G mobile terminals, a radio network controller (RNC) 220 for controlling the node B 210, a 3G mobile switching center (3G MSC) 240 connected to at least one RNC 220 for switching calls, a 3G gate mobile switching center (GMSC) 230 connected between the PSTN 70 and the 3G MSC 240, for interworking networks and switching calls, a serving GPRS support node (SGSN) 260 connected to the RNC 220 and the IP network 30, for maintaining location tracking for mobile terminals, and performing access control and security functions, and a gateway GPRS support node (GGSN) 270 connected to the IP network 30 for supporting interworking of the connected network with external packets, and also connected through the medium of the SGSN and an IP-based packet domain PLMN backbone network.

The asynchronous mobile communication network 20 further includes a serving mobile location center (SMLC) 250 on which a GPS receiver is mounted. When receiving a location tracking request for the terminal (mobile communication terminal on which the GPS receiver has been mounted) from the location tracking request system 80, the SMLC 250 interworks with the asynchronous mobile communication terminal on which the GPS receiver has been mounted, and determines location of the mobile communication terminal.

The SS7 network 40 mutually connects the 2/2.5G MSC 130, the 2/2.5G CGS 150, the 3G MSC, the 3G GMSC 230, the SGSN 260 and the GGSN 270, for processing and switching calls.

The D-HLR 50 is connected to the SS7 network 40, for collectively managing a call processing database such as location registration for synchronous and asynchronous mobile communication network subscribers, and performing the whole functions of the 2/2.5G HLR and the 3G HLR.

Figure 2:
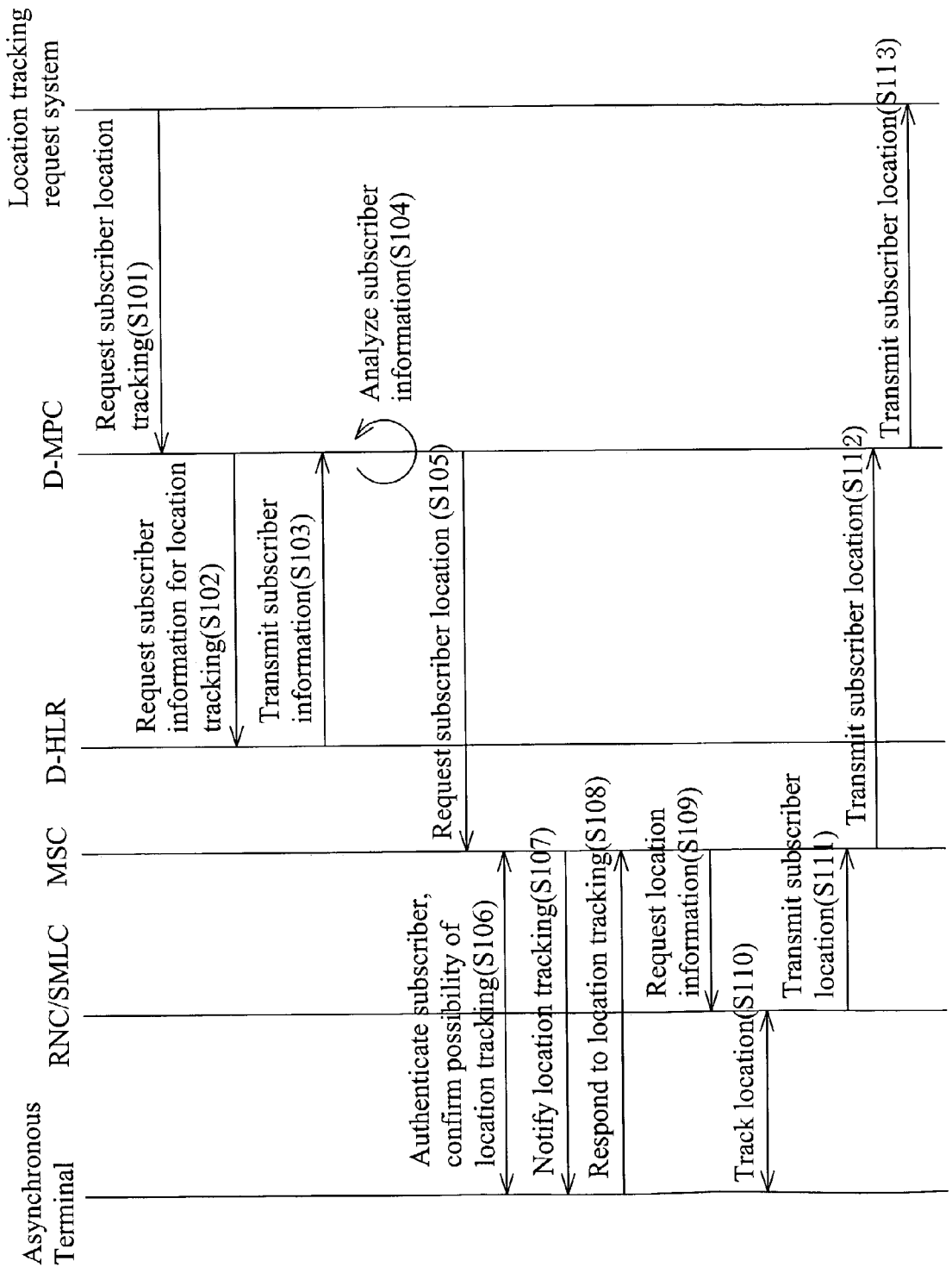
FIG. 2 is a flowchart showing sequential steps of a method for tracking location of subscribers in an asynchronous mobile communication network in accordance with a first embodiment of the present invention.

FIG. 2 is a flowchart showing sequential steps of the method for tracking location of subscribers in the asynchronous mobile communication network in accordance with the first embodiment of the present invention. Here, the location tracking request system 80 requests high accuracy location tracking, namely by a GPS satellite and receiver, a location tracking object is an asynchronous mobile communication terminal, and location of the terminal is tracked by using the GPS receiver mounted on the terminal.

When the location tracking request system 80 requests location tracking for a subscriber terminal to the D-MPC 60 by transmitting a number MSISDN of the terminal (Location Request)(S101), the D-MPC 60 confirms the dialing number MSISDN of the corresponding terminal, and requests location information of the terminal to the D-HLR 50 with the dialing number MSISDN (SRIFORLCS[MSISDN]; Send Routing Information for Location Service)(S102).

The D-HLR 50 extracts the location information of the subscriber including a subscriber identifier (IMSI) of the terminal, subscriber number information (MIN) and a node number of a network which the terminal roams, and transmits the information to the D-MPC 60 (sriforlcs[IMSI, MIN, Network Node Number])(S103). The D-MPC 60 confirms whether the terminal belongs to the synchronous mobile communication network MSC or asynchronous mobile communication network MSC according to the response signal (S104). When the terminal belongs to the asynchronous mobile communication network MSC, the D-MPC 60 requests the corresponding MSC 240 to confirm the subscriber location (PROVIDESUBSCRIBERLOCATION) (S105).

Thereafter, the 3G MSC 240 authenticates the terminal (S106). In the case that the terminal is located in another public land mobile network (PLMN) or another country, the 3G MSC 240 preferably performs a step for confirming whether the location tracking request for the terminal is allowed in the PLMN or country in which the terminal is located. In addition, the 3G MSC 240 confirms a profile of the subscriber using the terminal. When the terminal has designated notification of the personal information-related services, the 3G MSC 240 notifies the location tracking to the terminal (LCS Location Notification Invoke)(S107). When the location tracking has been transmitted to the terminal, the terminal notifies allowance or rejection of the location tracking (LCS Location Notification Return Result) (S108).

The MSC 240 requests the location information of the terminal to the SMLC 250 (Location Report Control)(S109), and the SMLC 250 interworks with the terminal and tracks location of the terminal (S110). In this embodiment, the terminal includes a GPS receiver, and thus the SMLC 250 transmits location tracking values (latitude, longitude, altitude of terminal) and error rate satisfying quality of service to the 3G MSC 240 (locationreport)(S111).

The MSC 240 receiving the location of the terminal transmits the location of the terminal to the D-MPC 60 as a response signal to the subscriber location request of S105 (providesubscriberlocation)(S112), and the D-MPC 60 converts the location tracking values into real geographical name information, and transmits the information to the location tracking request system 80 (Location Result) (S113). The process for converting the location tracking values into the real geographical name information can be performed in the location tracking request system 80. The D-MPC 60 or the location tracking request system 80 must have a database for matching coordinates values to real geographical names in order to convert the location tracking values into the real geographical name information.

Figure 3:
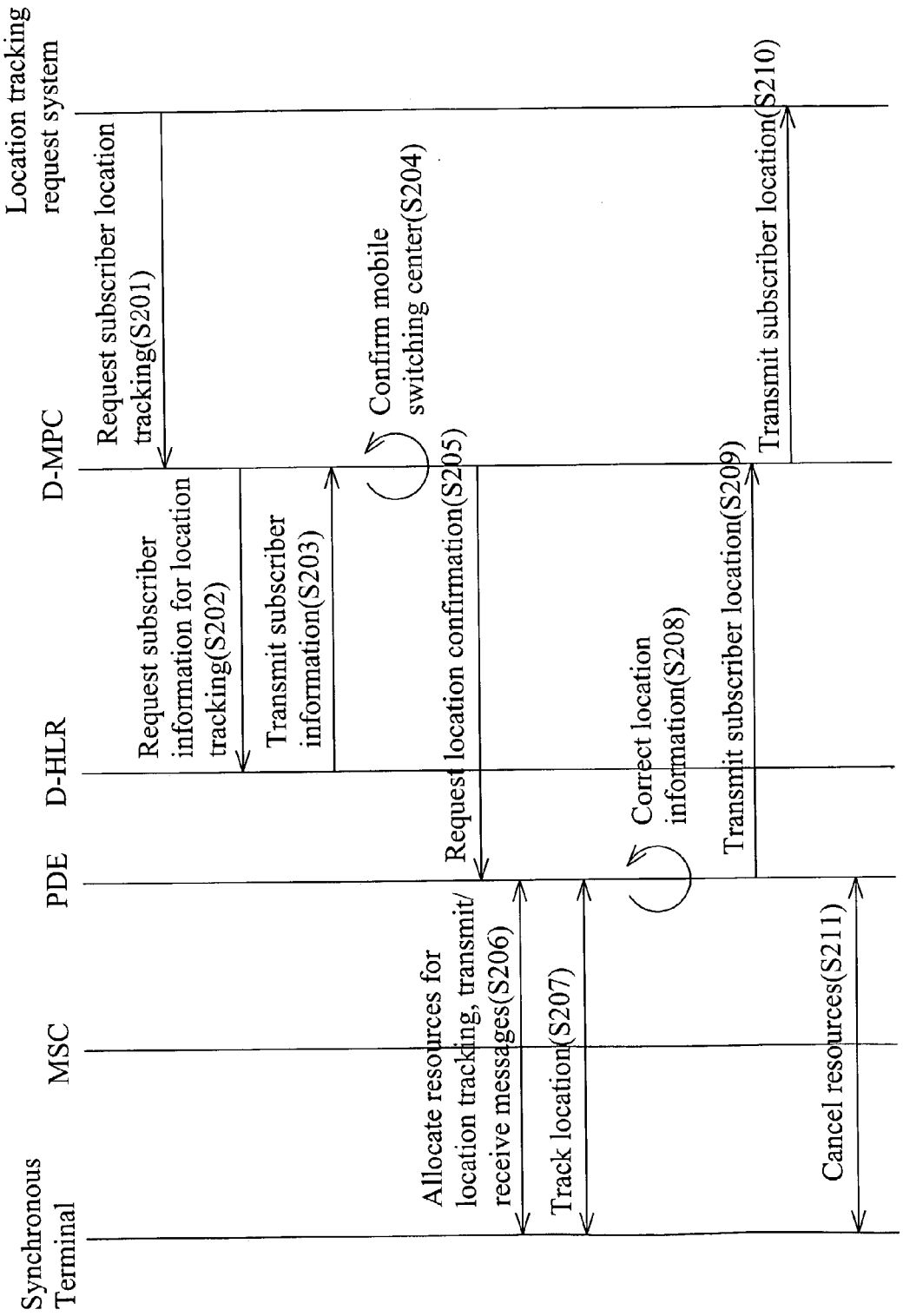
FIG. 3 is a flowchart showing sequential steps of a method for tracking location of subscribers in a synchronous mobile communication network in accordance with the first embodiment of the present invention.

FIG. 3 is a flowchart showing sequential steps of the method for tracking location of subscribers in the synchronous mobile communication network in accordance with the first embodiment of the present invention. Here, the location tracking request system requests high accuracy location tracking, namely by a GPS satellite and receiver, a location tracking object is a synchronous mobile communication terminal, and location of the terminal is tracked by using the GPS receiver mounted on the terminal.

When the location tracking request system 80 requests location tracking for a subscriber terminal to the D-MPC 60 by transmitting a number MSISDN of the terminal (Location Request)(S201), the D-MPC 60 confirms the dialing number MSISDN of the corresponding terminal, and requests location information of the terminal to the D-HLR 50 with the dialing number MSISDN (SRIFORLCS[MSISDN]; Send Routing Information for Location Service)(S202).

The D-HLR 50 extracts the location information of the subscriber including a subscriber identifier (IMSI) of the terminal, subscriber number information (MIN) and a node number of a network which the terminal roams, and transmits the information to the D-MPC 60 (sriforlcs[IMSI, MIN, Network Node Number])(S203). The D-MPC 60 confirms whether the terminal belongs to the synchronous mobile communication network MSC or asynchronous mobile communication network MSC according to the response signal (S204). When the terminal belongs to the synchronous mobile communication network MSC 130, the D-MPC 60 requests the PDE 140 to confirm the subscriber location (GPOSREQ[POSREQTYPE, ESN, MIN, MSCID])(GPOSREQ; Geo Position Request)(S205). Accordingly, the PDE 140 requests location tracking to the 2/2.5G MSC 130, and the 2/2.5G MSC 130 allocates resources and channels for location tracking to the terminal (S206). Here, the step for allocating the resources and channels to the terminal for location tracking (S206) is performed by using SMS delivery point to point (SMDPP) and data burst messages, and the message flow procedure is performed under the IS-801-1 standards.

Thereafter, the PDE 140 interworks with the terminal and tracks location of the terminal (S207). The PDE 140 extracts accurate latitude, longitude and altitude coordinates of the terminal, and corrects them within the error range (S208) When the location of the terminal has been determined, the PDE 140 transmits the location of the terminal to the D-MPC 60 as a response signal to the subscriber location request of S205 (gposreq[POSINFO, POSRESULT])(S209), and the D-MPC 60 converts the location tracking values into real geographical name information, and transmits the information to the location tracking request system 80 (Location Result)(S210).

The process for converting the location tracking values into the real geographical name information can be performed in the location tracking request system 80. The D-MPC 60 or the location tracking request system 80 must have a database for matching coordinates values to real geographical names in order to convert the location tracking values into the real geographical name information.

The resources and channels allocated to the terminal for location tracking are canceled (S211).

Figure 4:
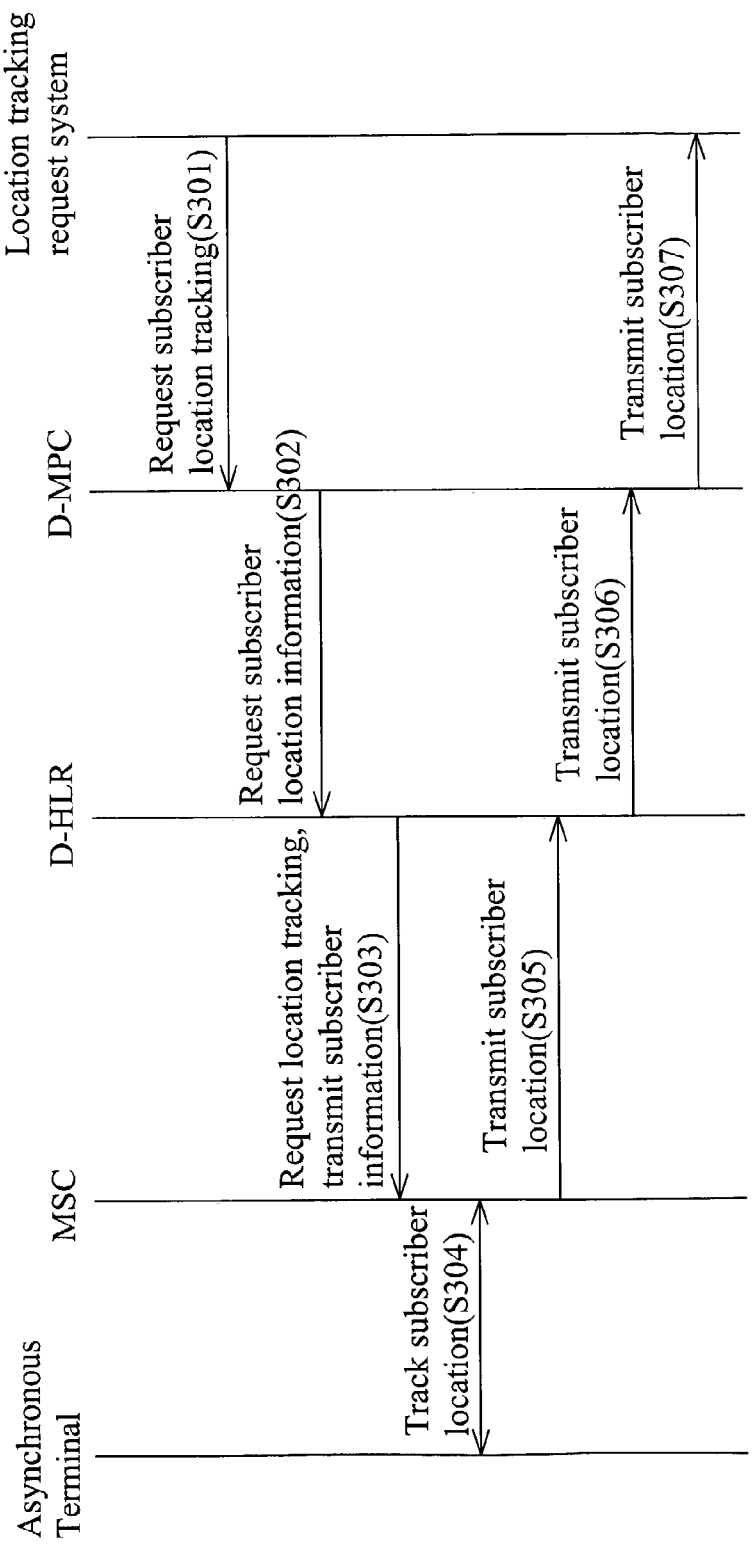
FIG. 4 is a flowchart showing sequential steps of a method for tracking location of subscribers in an asynchronous mobile communication network in accordance with a second embodiment of the present invention.

FIG. 4 is a flowchart showing sequential steps of the method for tracking location of subscribers in the asynchronous mobile communication network in accordance with a second embodiment of the present invention. Here, a location tracking object is an asynchronous mobile communication terminal, and the location tracking request system 80 requests low accuracy location tracking based on a cell.

When the location tracking request system 80 requests location tracking for a subscriber terminal to the D-MPC 60 by transmitting a number MIN of the terminal (Location Request)(S301), the D-MPC 60 confirms the dialing number MIN of the corresponding terminal, and requests location information of the terminal to the D-HLR 50 with the dialing number MIN (PAGEREQ[MIN])(S302).

The D-HLR 50 confirms the 3G MSC which the terminal roams, and requests the corresponding MSC 240 to track location of the subscriber with a location information request signal, subscriber state and current location information (PROVIDESUBSCRIBERINFORMATION[Locationinfo, SubscriberState, Currentlocation])(S303). In this embodiment, the terminal does not include a GPS receiver, and thus the location of the terminal can be tracked by paging (S304). Exemplary methods for tracking location of terminals based on the cell include an angle of arrival (AOA) method for tracking location of a terminal at a base station by measuring an arrival angle of a signal from the terminal, a time of arrival (TOA) method for tracking location of a terminal by measuring a transmission time of an electric wave by using an arrival time of the electric wave, and a time difference of arrival (TDOA) method for tracking location of a terminal by using difference of arrival time of electric waves from two base stations.

The MSC 240 receiving the location of the terminal transmits location tracking values of the subscriber including the subscriber information and state to the D-HLR (providesubscriberinfo[Subscriberinfo, SubscriberState]) (S305), and also transmits the location tracking values of the terminal to the D-MPC 60 with an ID of the MSC which the terminal belongs to and an area ID (pagereq[MSCID, LocationAreaID])(S306). The D-MPC 60 converts the location tracking values into real geographical name information, and transmits the information to the location tracking request system 80 (Location Result)(S307).

The process for converting the location tracking values into the real geographical name information can be performed in the location tracking request system 80. The D-MPC 60 or the location tracking request system 80 must have a database for matching coordinates values to real geographical names in order to convert the location tracking values into the real geographical name information.

On the other hand, when the location of the terminal is not tracked in S304, the D-HLR 50 preferably sets up failure reasons (ACCDEN) in a pagereq message, and transmits the message to the location tracking request system 80.

Figure 5:
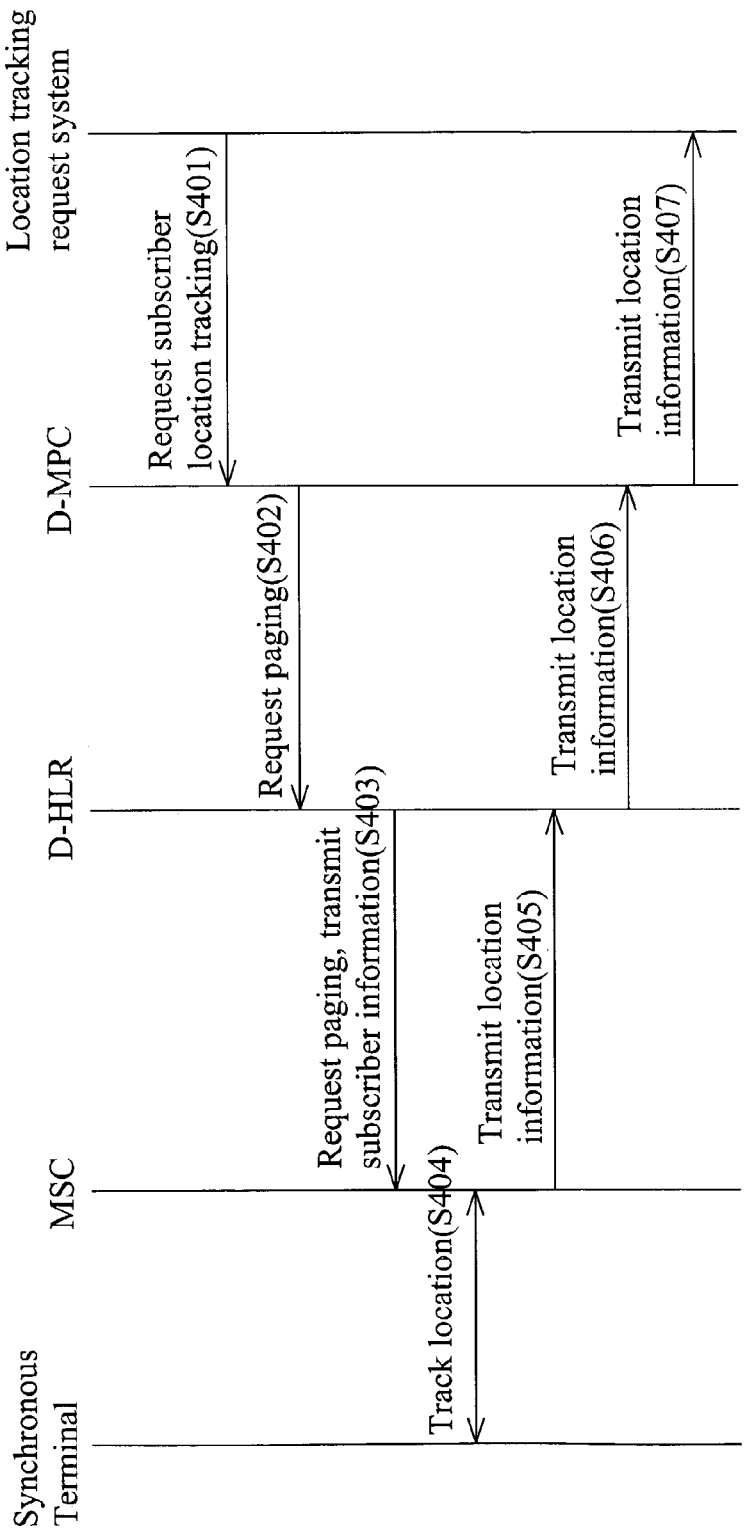
FIG. 5 is a flowchart showing sequential steps of a method for tracking location of subscribers in a synchronous mobile communication network in accordance with the second embodiment of the present invention.

FIG. 5 is a flowchart showing sequential steps of the method for tracking location of subscribers in the synchronous mobile communication network in accordance with the second embodiment of the present invention. Here, a location tracking object is a synchronous mobile communication terminal, and the location tracking request system 80 requests low accuracy location tracking based on a cell.

When the location tracking request system 80 requests location tracking for a subscriber terminal to the D-MPC 60 by transmitting a number MIN of the terminal (Location Request)(S401), the D-MPC 60 confirms the dialing number MIN of the corresponding terminal, and requests location information of the terminal to the D-HLR 50 with the dialing number MIN (PAGEREQ[MIN])(S402).

The D-HLR 50 confirms the 2/2.5G MSC which the terminal roams, and requests the corresponding MSC 130 to track location of the terminal by transmitting the dialing number and apparatus number of the terminal (PAGEREQ [MIN, ESN])(S403). In this embodiment, the terminal does not include a GPS receiver, and thus the location of the terminal can be tracked by paging (S404). Exemplary methods for tracking location of terminals based on the cell include an angle of arrival (AOA) method for tracking location of a terminal at a base station by measuring an arrival angle of a signal from the terminal, a time of arrival (TOA) method for tracking location of a terminal by measuring a transmission time of an electric wave by using an arrival time of the electric wave, and a time difference of arrival (TDOA) method for tracking location of a terminal by using difference of arrival time of electric waves from two base stations.

The MSC 130 receiving the location tracking values of the terminal transmits the location tracking values of the terminal including an ID of the MSC which the terminal roams and an area ID to the D-HLR 50 (pagereq[MSCID, LocationAreaID])(S405). The D-HLR 50 transmits the message to the D-MPC 60. The D-MPC 60 converts the location tracking values of the terminal into real geographical name information, and transmits the information to the location tracking request system 80 (Location Result)(S407).

The process for converting the location tracking values into the real geographical name information can be performed in the location tracking request system 80. The D-MPC 60 or the location tracking request system 80 must have a database for matching coordinates values to real geographical names in order to convert the location tracking values into the real geographical name information.

On the other hand, when the location of the terminal is not tracked in S404, the D-HLR 50 preferably sets up failure reasons (ACCDEN) in a pagereq message, and transmits the message to the location tracking request system 80.

In accordance with the method for tracking the location of FIGS. 2 to 5, the D-MPC 60 can further perform a step for generating a position detail record (PDR) including location tracking details of the terminal after transmitting the location information of the terminal to the location tracking request system 80. Moreover, the location of the mobile communication terminal can be tracked according to whether the terminal exists in the synchronous or asynchronous mobile communication network, whether the terminal includes the GPS receiver, and accuracy of the service requested by the location tracking request system.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

As discussed earlier, in accordance with the present invention, the location of the synchronous and asynchronous mobile communication network subscribers can be tracked by using the D-HLR and the D-MPC in the network in which the synchronous and asynchronous mobile communication networks coexist. The location of the subscribers can also be appropriately tracked according to mounting of the GPS receivers on the mobile communication terminals and accuracy of services requested by the location tracking request system. In addition, the service can be continuously provided between the generations by interworking networks using different protocols.

What is claimed is:

1. A method for tracking location of subscribers in a dual stack mobile communication network which a synchronous mobile communication network and an asynchronous mobile communication network coexist in, and which includes a dual stack home location register connected to a SS7 network for storing and collectively managing synchronous and asynchronous mobile communication network subscriber information, and a dual stack mobile positioning center connected to the dual stack home location register through the SS7 network for receiving a location tracking request for a synchronous or asynchronous mobile communication terminal from a location tracking request system, searching roaming information for the terminal from dual stack home location register, requesting location tracking for the terminal to a mobile switching center which the terminal roams, and transmitting the location information of the terminal to the location tracking request system, the synchronous and asynchronous mobile communication networks respectively including a position determination entity, comprising the steps of:

in accordance with that the location tracking request system requests the dual stack mobile positioning center to track the location of the asynchronous mobile communication terminal by using a GPS satellite and receiver by transmitting a number of the terminal, confirming a dialing number of the terminal at the dual stack mobile positioning center, and requesting location information of the terminal to the dual stack home location register;

extracting the location information of the terminal at the dual stack home location register, and transmitting the information to the dual stack mobile positioning center, wherein the location information of the terminal extracted at the dual stack home location register comprises a subscriber identifier, subscriber number information, and a node number of a network which the terminal belongs to;

when the dual stack mobile positioning center confirms the mobile switching center which the terminal roams and thus confirms that the terminal belongs to the asynchronous mobile communication network mobile switching center, requesting location tracking for the subscriber to the corresponding asynchronous mobile switching center;

requesting the location information of the terminal to a serving mobile location center at the asynchronous mobile switching center;

when a GPS receiver has been mounted on the terminal, at the serving mobile location center determining location tracking values of the terminal by interworking with the terminal;

receiving the location information of the terminal at the mobile switching center from the serving mobile location center, and transmitting the location information to the dual stack mobile positioning center; and transmitting the location information of the terminal from the dual stack mobile positioning center to the location tracking request system.

2. The method of claim 1, wherein the step for requesting and receiving the location information of the terminal from the serving mobile location center by the mobile switching center further comprises a step for authenticating the terminal at the mobile switching center.

3. The method of claim 2, wherein the step for authenticating the terminal further comprises a step for confirming whether the location tracking request is allowed by a public land mobile network or country in which the terminal is located.

4. The method of claim 1, wherein the step for requesting and receiving the location information of the terminal from the serving mobile location center at the mobile switching center further comprises a step for notifying location tracking to the terminal, when the mobile switching center confirms a profile of the subscriber using the terminal, and when the terminal has designated notification of the personal information-related services.

5. The method of claim 1, further comprising a step for recording location tracking details of the terminal after the step for transmitting the location information of the terminal from the dual stack mobile positioning center to the location tracking request system.

6. The method of claim 1, wherein the step for transmitting the location information of the terminal from the dual stack mobile positioning center to the location tracking request system converts the location tracking values into real geographical name information at the dual stack mobile positioning center, and transmits the information to the location tracking request system.

7. The method of claim 1, wherein the step for transmitting the location information of the terminal from the dual stack mobile positioning center to the location tracking request system converts the location tracking values into real geographical name information at the location tracking request system receiving the location tracking values.

8. A method for tracking location of subscribers in a dual stack mobile communication network which a synchronous mobile communication network and an asynchronous mobile communication network coexist in, and which includes a dual stack home location register connected to a SS7 network for storing and collectively managing synchronous and asynchronous mobile communication network subscriber information, and a dual stack mobile positioning center connected to the dual stack home location register through the SS7 network for receiving a location tracking request for a synchronous or asynchronous mobile communication terminal from a location tracking request system, searching roaming information for the terminal from dual stack home location register, requesting location tracking for the terminal to a mobile switching center which the terminal roams, and transmitting the location information of the terminal to the location tracking request system, the synchronous and asynchronous mobile communication networks respectively including a position determination entity, comprising the steps of:

in accordance with that the location tracking request system requests the dual stack mobile positioning center to track the location of the asynchronous mobile communication terminal by using a GPS satellite and receiver by transmitting a number of the terminal, confirming a dialing number of the terminal at the dual stack mobile positioning center, and requesting location information of the terminal to the dual stack home location register;

extracting the location information of the terminal at the dual stack home location register, and transmitting the information to the dual stack mobile positioning center, wherein the location information of the terminal extracted from the dual stack home location register comprises a subscriber identifier, subscriber number information, and a node number of a network which the terminal belongs to;

when the dual stack mobile positioning center confirms the mobile switching center which the terminal roams and thus confirms that the terminal belongs to the synchronous mobile communication network mobile switching center, and when a GPS receiver has been mounted on the terminal, requesting location tracking for the subscriber to the corresponding position determination entity;

in accordance with that the position determination entity requests location tracking for the terminal to the mobile switching center, allocating resources and channels to the terminal at the mobile switching center;

interworking the position determination entity with the terminal, and tracking location of the terminal;

correcting the location, information of the terminal by the position determination entity, and transmitting the information to the dual stack mobile positioning center; and transmitting the location information of the terminal from the dual stack mobile positioning center to the location tracking request system.

9. The method of claim 8, wherein the step for allocating resources and channels to the terminal at the mobile switching center uses SMS delivery point to point and data burst messages.

10. The method of claim 8, further comprising a step for recording location tracking details of the terminal after the step for transmitting the location information of the terminal from the dual stack mobile positioning center to the location tracking request system.

11. The method of claim 8, wherein the step for transmitting the location information of the terminal from the dual stack mobile positioning center to the location tracking request system converts the location tracking values into real geographical name information at the dual stack mobile positioning center, and transmits the information to the location tracking request system.

12. The method of claim 8, wherein the step for transmitting the location information of the terminal from the dual stack mobile positioning center to the location tracking request system converts the location tracking values into real geographical name information at the location tracking request system receiving the location tracking values.

13. A method for tracking location of subscribers in a dual stack mobile communication network which a synchronous mobile communication network and an asynchronous mobile communication network coexist in, and which includes a dual stack home location register connected to a SS7 network for storing and collectively managing synchronous and asynchronous mobile communication network subscriber information, and a dual stack mobile positioning center connected to the dual stack home location register through the SS7 network for receiving a location tracking request for a synchronous or asynchronous mobile communication terminal from a location tracking request system, searching roaming information for the terminal from dual stack home location register, requesting location tracking for the terminal to a mobile switching center which the terminal roams, and transmitting the location information of the terminal to the location tracking request system, the synchronous and asynchronous mobile communication networks respectively including a position determination entity, comprising the steps of:

in accordance with that the location tracking request system requests the dual stack mobile positioning center to track the location, of the asynchronous mobile communication terminal based on a cell by transmitting a number of the terminal, confirming a dialing number of the terminal at the dual stack mobile positioning center, and requesting location information of the terminal to the dual stack home location register;

confirming the mobile switching center which the terminal roams at the dual stack home location register, and requesting location information of the subscriber to the mobile switching center, wherein the step for requesting the location information of the subscriber to the mobile switching center from the dual stack home location register transmits subscriber state and current location information with the location information request for the terminal;

in accordance with that a base station tracks the location of the terminal according to paging between the terminal and the base station, and transmits the location information of the terminal to the mobile switching center, transmitting the location information of the terminal from the mobile switching center to the dual stack home location register, wherein the step for transmitting the location information of the terminal from the mobile switching center to the dual stack home location register further transmits the subscriber information and subscriber state information; and transmitting the location information of the terminal from the dual stack home location register to the dual stack mobile positioning center.

14. The method of claim 13, wherein the base station confirms the location of the terminal by using one of an angle of arrival, a time of arrival, and a time difference of arrival.

15. The method of claim 13, wherein the step for transmitting the location information of the terminal from the dual stack home location register to the dual stack mobile positioning center transmits the location information with an ID of the mobile switching center which the terminal belongs to and an area ID.

16. The method of claim 15, wherein the step for transmitting the location information of the terminal from the dual stack home location register to the dual stack mobile positioning center transmits the location information with location tracking failure reasons, when the location of the terminal is not tracked.

17. The method of claim 13, further comprising a step for recording location tracking details of the terminal after the step for transmitting the location information of the terminal from the dual stack mobile positioning center to the location tracking request system.

18. The method of claim 13, wherein the step for transmitting the location information of the terminal from the dual stack mobile positioning center to the location tracking request system converts the location tracking values into real geographical name information at the dual stack mobile positioning center, and transmits the information to the location tracking request system.

19. The method of claim 13, wherein the step for transmitting the location information of the terminal from the dual stack mobile positioning center to the location tracking request system converts the location tracking values into real geographical name information at the location tracking request system receiving the location tracking values.

20. A method for tracking location of subscribers in a dual stack mobile communication network which a synchronous mobile communication network and an asynchronous mobile communication network coexist in, and which includes a dual stack home location register connected to a SS7 network for storing and collectively managing synchronous and asynchronous mobile communication network subscriber information, and a dual stack mobile positioning center connected to the dual stack home location register through the SS7 network for receiving a location tracking request for a synchronous or asynchronous mobile communication terminal from a location tracking request system, searching roaming information for the terminal from dual stack home location register, requesting location tracking for the terminal to a mobile switching center which the terminal roams, and transmitting the location information of the terminal to the location tracking request system, the synchronous and asynchronous mobile communication networks respectively including a position determination entity, comprising the steps of:

in accordance with that the location, tracking request system requests the dual stack mobile positioning center to track the location of the synchronous mobile communication terminal based on a cell by transmitting a number of the terminal, confirming a dialing number of the terminal at the dual stack mobile positioning center, and requesting location information of the terminal to the dual stack home location register;

confirming the mobile switching center which the terminal roams at the dual stack home location register, and requesting location information of the subscriber to the mobile switching center;

in accordance with that a base station tracks the location of the terminal according to paging between the terminal and the base station and transmits the location information of the terminal to the mobile switching center, transmitting the location information of the terminal from the mobile switching center to the dual stack home location register, wherein the step of transmitting the location information of the terminal from the mobile switching center to the dual stack home location register transmits the location information with an ID of the mobile switching center which the terminal belongs to and an area ID; and transmitting the location information of the terminal from the dual stack home location register to the dual stack mobile positioning center.

21. The method of claim 20, wherein the step for requesting the mobile switching center to track location of the terminal at the dual stack home location register transmits a dialing number and an apparatus number of the terminal.

22. The method of claim 20, wherein the base station confirms the location of the terminal by using one of an angle of arrival, a time of arrival, and a time difference of arrival.

23. The method of claim 20, wherein the step for transmitting the location information of the terminal from the mobile switching center to the dual stack home location register transmits the location information with location tracking failure reasons, when the location of the terminal is not tracked.

24. The method of claim 20, wherein the step for transmitting the location information of the terminal from the dual stack mobile positioning center to the location tracking request system converts the location tracking values into real geographical name information at the dual stack mobile positioning center, and transmits the information to the location tracking request system.

25. The method of claim 20, wherein the step for transmitting the location information of the terminal from the dual stack mobile positioning center to the location tracking request system converts the location tracking values into real geographical name information at the location tracking request system receiving the location tracking values.

* * * * *